July 18, 1967 M. M. ROUZIER 3,331,953

SELF-CHECKING COUNTER

Filed March 11, 1964 3 Sheets-Sheet 1

INVENTOR
MICHEL M. ROUZIER
BY
Abraham A. Saffitz
ATTORNEY

July 18, 1967 M. M. ROUZIER 3,331,953

SELF-CHECKING COUNTER

Filed March 11, 1964 3 Sheets-Sheet 2

INVENTOR
MICHEL M. ROUZIER
BY
Abraham A. Saffitz
ATTORNEY

July 18, 1967 M. M. ROUZIER 3,331,953

SELF-CHECKING COUNTER

Filed March 11, 1964 3 Sheets-Sheet 3

INVENTOR

MICHEL M. ROUZIER

BY

Abraham A. Saffitz

ATTORNEY

United States Patent Office 3,331,953

Patented July 18, 1967

3,331,953

SELF-CHECKING COUNTER

Michel M. Rouzier, 15 Chemin de la Sabliere, Vauhallan, France

Filed Mar. 11, 1964, Ser. No. 351,154
Claims priority, application France, Mar. 13, 1963, 927,840; Mar. 3, 1964, 965,914
5 Claims. (Cl. 235—153)

ABSTRACT OF THE DISCLOSURE

A device for checking the operation of a multiple stage binary counter with programmed progression comprising a progression register, an image register, a source of progression pulses and transfer pulses emanating from a time base circuit applied to all stages of the counter, wherein means are provided for checking the parity of the progression register after each progression pulse and for checking the parity of the image register after each transfer pulse.

The present invention relates to the continuous checking of the operation of an electronic counter, the progression of which is programmed in accordance with a given code.

It is known that in order to cause a binary counter to progress in accordance with a code which is not necessarily the binary code, for example in accordance with the "three out of six" code, the progression pulses leaving a time base may be applied in parallel to all the stages of the counter by means of gates, each of the gates being opened or closed according to the position of certain stages in said counter.

These positions may be modified by the progression pulses but it is necessary to maintain said gates in their initial position throughout the whole duration of each pulse by means of circuits comprising a store. For this purpose, it is known to use a counter composed of two registers, the first register being known as the progression register which is controlled by progression pulses applied in parallel to all of its stages by means of gates controlled by the second, known as the image register, to which the contents of the first are transferred after each progression pulse.

Such counters with programmed progression are used in computers and in particular to control connection networks in automatic telephone switches where automatic checking of their operation has proved essential.

The object of the invention is to enable a continuous checking to be effected of the operation of such a binary counter with two registers.

A general feature of the invention is that the checking of the operation of a binary counter, the progression of which is programmed in accordance with a given code, is based on a law associated with said code.

A particular object of the invention is to provide a device for the continuous checking of the operation, in accordance with a programmed progression, of a binary counter with two registers.

One feature of the device of the invention is that it comprises the means for checking on the one hand that the parity of the binary numbers transferred from the progression register to the image register is adhered to, and on the other hand that the parity of the binary number resulting from a progression is in accordance with the law of progression, and indicating and/or control means capable of giving an alarm and/or of replacing the counter in service by a replacement counter.

In the present specification, the parity of a binary number is understood to means the parity of the decimal number expressing the number of binary digits equal to 1 which it contains.

According to the invention, a device is proposed for checking the operation of a binary counter with programmed progression, the present device comprising a progression register, an image register and a pulse distributor which alternately applies a progression pulse to the progression register and a transfer pulse from the progression register to the image register, comprises means for determining the parity of the progression register, means for determining the parity of the image register, means for checking to assure that after each transfer pulse, the parity of the image register is the same as that of the progression register, means for determining based on the state of the image register the parity of the progression register which should result from the following progression pulse, means for storing the last said parity and means for comparing, after each progression pulse, the parity of the progression register with the parity thus stored.

A further feature of the invention is that associated with said means for comparing parity is a flip-flop having a slow frequency in comparison with the repetition frequency of the progression pulses and the change of state of which reverses the polarity of the output signals of said means for comparing parity in such a manner that circuit faults such as a complete interruption or a short circuit, which might prevent the detection of an abnormal parity with unipolar signalling, are reliably disclosed.

The invention will be better understood on reading the following description and examining the accompanying drawings in which.

Figure 1:
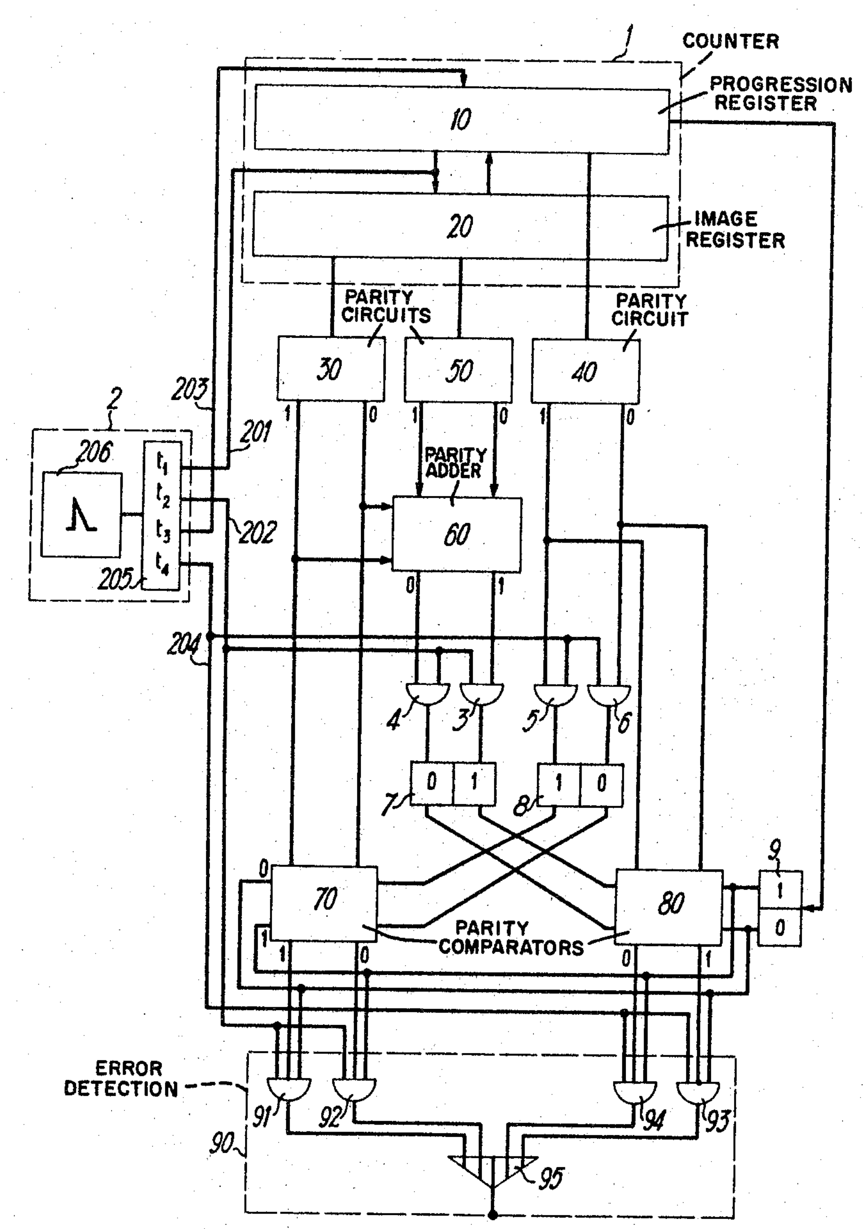
FIG. 1 is a block diagram of a counter the operation of which is checked in accordance with the invention.

FIG. 1 shows a counter comprising a progression register 10 and an image register 20. The counter 1 is controlled by a time base 2 comprising a pulse distributor 205 with four outputs which distributes cyclically to four wires 201 to 204, pulses emitted by a pulse generator 206 at recurrent moments $t_1$, $t_2$, $t_3$, $t_4$. The pulses applied at the time $t_1$ in each cycle to the wire 201 control the setting of the register 20 to the same state as the register 10 and are called transfer pulses. The pulses applied at the time $t_3$ in each cycle by the wire 203 to the register 10 control its progression under the supervision of the image register which determines the mode of progression selected. The parity of the numbers recorded in the counters 10 and 20 are determined respectively by parity circuits 40 and 30 each having two outputs of which one, marked 1 transmits a signal when the number recorded in the corresponding counter is odd, and the other, marked 0, when said number is even. A circuit 50 likewise comprising two outputs marked 1 and 0 determines, according to the position of the image counter 20, whether the parity, in the sense specified above, of the binary number consecutive to that which it contains is different from that of the number which it contains or the same.

The outputs of the parity circuit 30 are connected on the one hand to two inputs of a parity adder 60 and on the other hand to two inputs of a parity comparator 70 with six inputs. The outputs of the circuit 50 are connected to two other inputs of the parity adder 60 which likewise has two outputs marked 0 and 1 at each of which respectively there appears a signal according to whether the binary number greater by one unit than the binary number contained in the register 20 is even or odd. This result is stored at the moment $t_2$ in a flip-flop 7 the inputs of which are connected to the outputs of the adder 60 by means of AND-gates 4 and 3, the release inputs of which are connected in parallel with the wire 202. When the law of progression of the counter fixes a program of succession for the parities, the circuits 50 and 60 are omitted and the flip-flop 7 is set in position in accordance with this program depending on the state of the circuit 30.

The ouputs of the parity circuit 40 are connected on the one hand to two inputs of a parity comparator 80 with six inputs and on the other hand to the two inputs of a flip-flop 8 by means of two AND-gates 5 and 6, the release inputs of which are connected in parallel with the wire 204 in such a manner that the parity of the register 10 is stored at the time $t_4$ immediately after its progression which takes place at the time $t_3$. The two outputs of the flip-flop 8 are connected to two other inputs of the parity comparator 70, the two remaining inputs of which are respectively connected to the two outputs of a flip-flop 9 which changes its state at a slow rate, for example each time the register 10 passes from its maximum capacity to zero. Thus, when the parity of the image register agrees with the parity stored in the flip-flop 8 a signal appears at the zero output of the comparator 70 if the flip-flop 9 is at zero and at its 1 output if the flip-flop 9 is at 1; on the other hand, a signal indicating a difference in parity between the image register 20 and the flip-flop 8 appears at the 1 output of the comparator 70 when the flip-flop 9 is in the zero position and at the 0 output of said comparator when the flip-flop 9 is in the 1 position. The output 1 of the comparator 70 is connected to an output OR-gate 95 by means of an AND-gate 91 with three inputs, the second input of which is connected to the wire 202 and the third input to the zero output of the flip-flop 9. The 0 output of the comparator 70 is connected to the OR-gate 95 by means of an AND-gate 92 with three inputs of which the second input is connected to the wire 202 and the third input to the output 1 of the flip-flop 9. Thus a signal appears at the output of the gate 95 when, at the moment $t_2$, the parity of the register 20 does not agree with that of the register 10, that is to say when there has been an error in transfer between these registers. In the opposite case, no signal can pass through the gates 91, 92. In a similar manner, the two outputs of the flip-flop 7 are connected to two inputs of the parity comparator 80, the remaining inputs of which are connected respectively to the two outputs of the flip-flop 9; the outputs 1 and 0 of the comparator 80 are connected respectively to the OR-gate 95 through AND-gates 93 and 94, each of which has an input connected to the wire 204 and its third input connected individually to an output of the flip-flop 9. Thus a signal appears at the output of the gate 95 when, at the time $t_4$, the parity assumed by the register 10 does not correspond with the parity stored in the flip-flop 7 which is the parity fixed by the law of progression or calculated from the binary number consecutive to that which is in the image register 20. It will be seen that the association of the flip-flop 9 with the parity comparator circuits 70 and 80 enables either the signals appearing at the 1 output of said comparators or the signals appearing at their zero output to be used to obtain an error signal, according to the position of the flip-flop 9, which enables a fault to be detected in said circuits, such as a short-circuit or a complete interruption, which would prevent an error signal from appearing at one of their output terminals.

Figure 2:
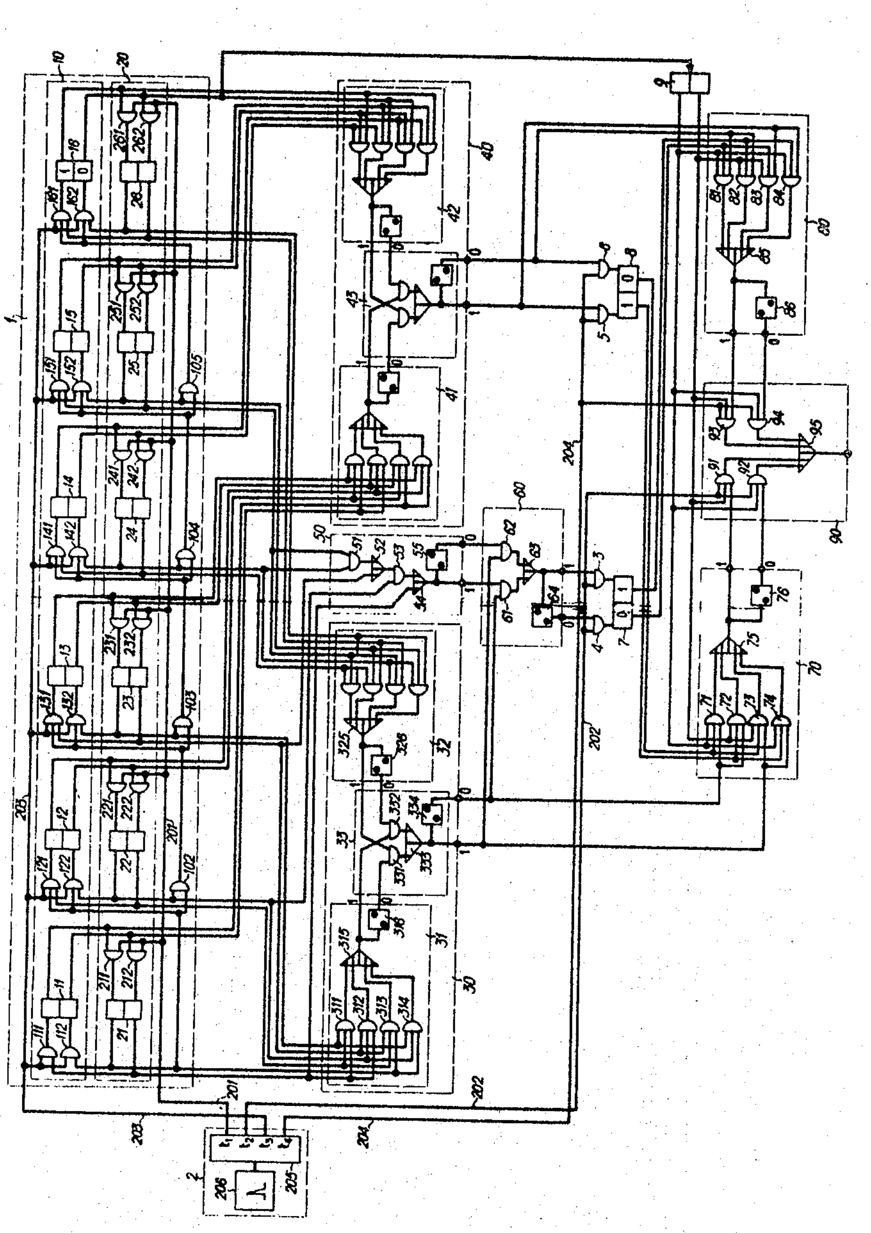
FIG. 2 is an example of an embodiment of a counter the operation of which is checked in accordance with FIG. 1 and the law of progression of which is in accordance with the binary code and, FIG. 3 is an example of an embodiment of a counter the operation of which is checked in accordance with FIG. 1 and the law of progression of which is in accordance with a code of the "three out of six" type.

FIG. 2 is a diagram of an example of an embodiment of a binary counter the operation of which is checked, as described above showing how the device of FIG. 1 may be adapted to a counter in which the law of progression follows the binary code and having any number of flip-flops.

In consequence, only the counter 1, the parity computers 30 and 40, the carry-checking circuit 50, the parity adder 60 and the parity comparators 70 and 80 will be described below.

The progression register 10 and the image register 20 of the counter 1 each comprise six flip-flops 11 to 16 and 21 and 26 respectively. The 1 inputs of the flip-flops 11, 12 . . . 16 are connected in parallel with the wire 203 by means of AND-gates 111, 121 to 161, a second input of which is connected to the zero output of the corresponding flip-flops 21, 22 to 26. The zero inputs of the flip-flops 11, 12 to 16 are likewise connected in parallel with the wire 203 by means of AND-gates 112, 122 to 162 a second input of which is connected to the 1 output of the corresponding flip-flops 21, 22 to 26. The 1 and zero inputs of the flip-flops 21, 22 to 26 are connected to the corresponding outputs of the flip-flops 11, 12 to 16 by means of AND-gate 211–212, 221–222 . . . 261–262 of which the second inputs are connected in parallel with the wire 201. The 1 output of the flip-flop 21 is connected in parallel with a third input of each of the gates 121, 122 and with one input of an AND-gate 102, of which the second input is connected to the 1 output of the flip-flop 22. The output of the gate 102 is connected in parallel with a third input of each of the gates 131, 132 and with an input of an AND-gate 103 which fulfils the same functions between the third and fourth stages of the counter 1 as the gate 102 between the second and third stages. AND-gates 104 and 105 are arranged in a similar manner between the following stages. It will be seen that, as a result, when a pulse is applied to the wire 201, the register 20 is brought into the same state as the register 10 and when a pulse is applied to the wire 203, the register 10 progresses by one unit in accordance with the binary code. Actually, in the register 10, each progression pulse arriving over the wire 203 causes the state of the flip-flop 11 to change and a flip-flop of given rank changes state when all the flip-flops of a lower rank change over from the 1 position to the zero position.

The parity circuit 30 adapted to determine the parity of the binary number recorded in the image register 20 is composed of two identical circuits 31 and 32 which determine separately the parity of the numbers recorded on the one hand in the three flip-flops 21, 22, 23 and on the other hand in the three flip-flops 24, 25, 26 and of a circuit 33 which determines the total parity which results from these two partial calculations.

The circuit 31 comprises four AND-gates 311 to 314 the outputs of which are connected to the four inputs of or OR-gate 315. The output of the gate 315 is connected directly to an output terminal marked 1 of the circuit 31 and, by means of a signal inverter 316, to an output terminal marked 0. The gates 311 to 314 each have three inputs connected to one of the outputs 1 or zero of the flip-flops 21, 22, 23 in such a manner as to form the four combinations of their two stages in which the number of 1's is odd. Thus the three inputs of the gate 311 are connected respectively to the outputs 0, 0, 1 of the flip-flops 21, 22, 23 those of the gate 312 to their outputs 0, 1, 0 and those of the gates 313, 314 respectively to their outputs 1, 0, 0 and 1, 1, 1. If one of these four combinations is effected, that is to say if the binary number recorded in the flip-flops 21, 22, 23 is odd, a signal appears at the terminal of the circuit 31 connected directly to the output of the gate 315 and in the opposite case a signal appears at the output of the inverter 316 showing that said binary number is even.

The circuit 32 is identical with the circuit 31, its inputs being connected to the outputs of the flip-flops 24, 25, 26 in the same manner as the inputs of the circuit 31 to the outputs of the flip-flops 21, 22, 23. A signal therefore appears at the output of the circuit 32 connected directly to the output of the OR-gate 325 when the binary number recorded in the flip-flops 24, 25, 26 is odd and at the output of the inverter 326 when said number is even.

The circuit 33 is composed of two AND-gates 331, 332, of an OR-gate 333 and of an inverter 334. The inputs of the gate 331 are connected respectively to the zero output of the circuit 31 and to the 1 output of the circuit 32 and the inputs of the gate 332 to the 1 output of the circuit 31 and zero output of the circuit 32. Thus a signal appears at the output of the OR-gate 333 which forms the 1 output of the parity circuit 30 when the binary numbers contained in each half of the register 20 have different parities and the binary number recorded in the register 20 is odd, and when said binary number is even a signal appears at the output of the inverter 334 which constitutes the zero output of the parity circuit 30.

The parity circuit 40 is identical with the parity circuit 30 and the inputs of its circuits 41, 42 are connected to the outputs of the flip-flops 11 to 16 in the same manner as the inputs of the circuit 30 to the outputs of the flip-flops 21 to 26. A signal appearing at the 1 output of the circuit 43 corresponds to an odd binary number in the register 10 and a signal at its zero output to an even number.

The carry-checking circuit 50 is adapted to determine, according to the position of the image register 20 previously brought into accordance with the register 10, whether the progression of the latter by one unit should or should not lead to a disagreement between their parities. It has two outputs, one marked 1 where a signal should appear in the event of disagreement being expected, the other marked 0 where a signal should appear when the parity should not change. Since this should change every time the flip-flop 11 changes from zero to 1 and the condition for this change of state is that the flip-flop 21 is in the zero position, the zero output of the flip-flop 21 is connected to one input of an OR-gate 54, the output of which is connected directly to the output 1 of the circuit 50 and by means of an inverter 55 to its zero output. When the flip-flop 11 changes over from 1 to zero, the flip-flop 12 changes either from zero to 1, in which case there is no change of parity, or from one to zero in which case the flip-flop 13 changes its state. If the flip-flop 13 changes from zero to 1, there is a change of parity because two flip-flops 11 and 12 change from 1 to zero whereas only one, 13, changes from zero to 1. This anticipated change of parity is introduced by an AND-gate 53, the output of which is connected to the second input of the gate 54 and which has an input connected to the output 1 of the flip-flop 22 (condition for the flip-flop 12 to be able to change from 1 to zero) and the other, by means of an OR-gate 52, to the zero output of the flip-flop 23 (condition for the flip-flop 13 to be able to change from zero to 1). It will be seen that there is a change of parity every time a carry is propagated as far as a stage of odd rank. Thus an AND-gate 51, which has one input connected to the output 1 of the flip-flop 24 (condition for the flip-flop 14 to change from 1 to zero) its second input connected to the zero output of the flip-flop 25 (condition for the flip-flop 15 to change from zero to 1) and its output connected to the second input of the gate 52, introduces a forecast of change of parity if the carry should reach the flip-flop 15 of fifth rank. Obviously, this process may be extended to any number of flip-flops.

The circuit 60 is identical with the circuit 33. Its inputs gates 61 and 62 are connected respectively the one to the 0 output of the circuit 33 and to the 1 output of the circuit 50, the other to the 1 output of the circuit 33 and to the zero output of the circuit 50. If the parity calculated by the circuit 30 is odd and the output signal delivered by the circuit 50 is even, that is to say it appears at its 0 output to signify that the progression of the register 10 should not alter its parity, or if the parity calculated by the circuit 30 is even and the signal delivered by the circuit 50 is odd, a signal appears at the output of the OR-gate 63 indicating that the parity forecast for the number which should result from a progression of the register 10 by one unit is odd. In other cases, the appearance of a signal at the output of the inverter 64 indicates that the parity forecast is even. As explained with reference to FIG. 1, this result is stored at the time $t_2$ in the flip-flop 7, the progression of the register 10 is controlled at the time $t_3$ and the parity of the new number recorded in the register 10, calculated by the circuit 40, is stored at the time $t_4$ in the flip-flop 8.

The parity comparator circuits 70 and 80 are identical with the circuit 31. The input connections of their four AND-gate 71–74, 81–84 are made in accordance with the four odd combinations of the three binary signals appearing at the outputs of the flip-flop 9 and for the first from the circuit 30 and from the flip-flop 8, for the second from the circuit 40 and the flip-flop 7. A signal indicating a disagreement between the parities of the signals compared appears at the output of the OR-gate 75 or 85 of these circuits when the flip-flop 9 is in the zero position and at the output of the inverter 76 or 86 in the opposite case.

Figure 3:
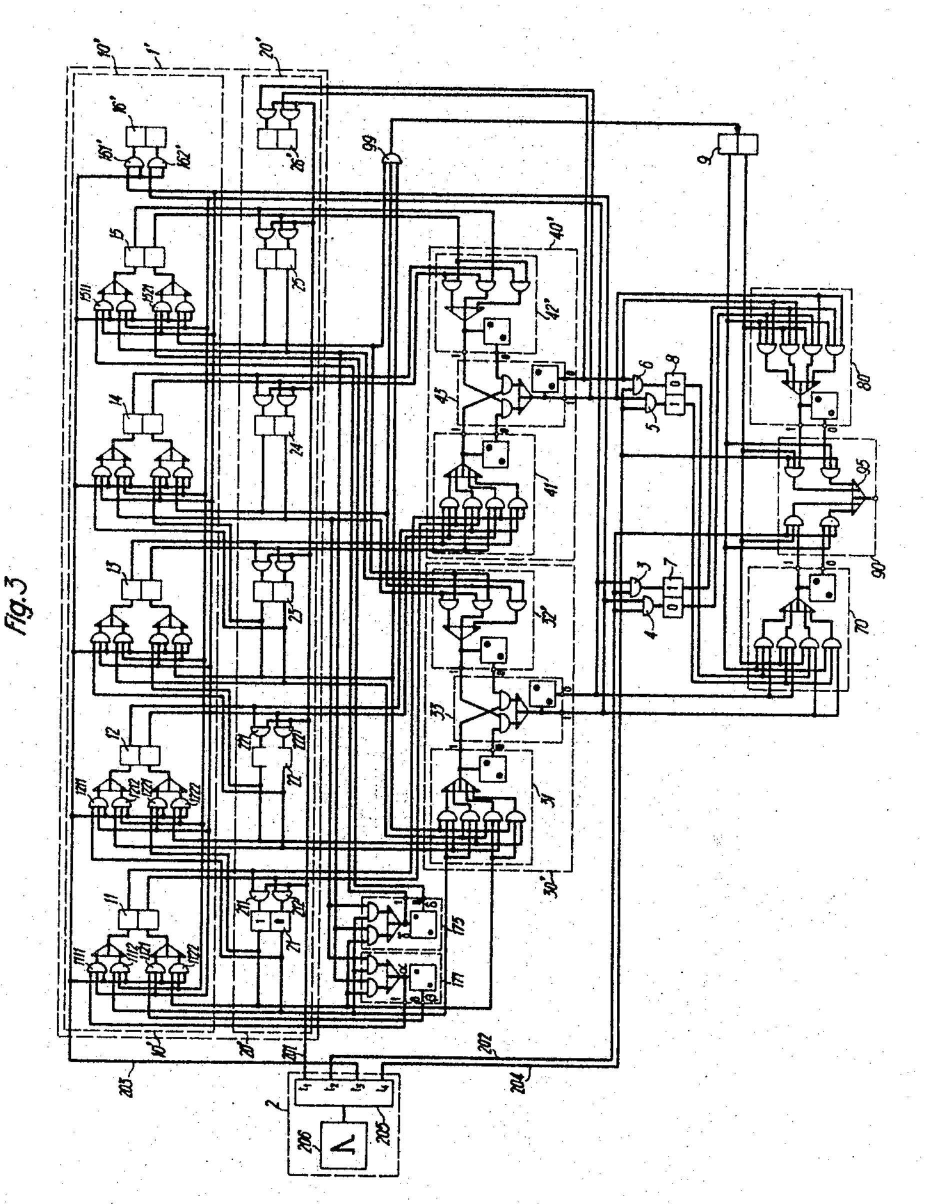

FIG. 3 shows diagrammatically a form of embodiment of a binary counter the operation of which is checked in accordance with the case where the law of progression follows a test code, in this instance a code of "three out of six" type, and also implies an order of succession of the parity of the numbers in such a manner that the circuits 50 and 60 do not appear.

In order to facilitate the comparison between this form of embodiment and that in FIG. 2, the members in this latter figure, which re-appear in FIG. 3 here bear the same reference numerals without any change when they are identical and marked with the "prime" sign when their structure or use has been modified and additional explanations are provided relating thereto.

The counter 1′ consists of two registers, a progression register 10′ and an image register 20′ each comprising six flip-flops, of which the first five, 11 to 15 and 21 to 25 respectively, determine the numbers recorded in each of them and of which the sixth, 16′ and 26′ respectively, serves to supplement these numbers by a sixth element in accordance with the "three out of six" code. In order that this code may be adhered to, it is therefore necessary for the numbers indicated by the first 5 flip-flops in each of the registers always to be either of the "2 out of 5" type, in which case the sixth flip-flop should indicate the digit one, or of the "3 out of 5" type in which case the sixth flip-flop should indicate zero.

The parity calculation only relates to the first five binary elements so that the circuits 30′ and 40′ differ from the circuits 30 and 40 in that that the circuits 32′ and 42′ are simplified in comparison with the circuits 32 and 42. The circuit 30′ determines the parity of the number indicated by the five flip-flops 21 to 25 of the image register 20′. Its zero and one outputs are respectively connected to the one and zero inputs of the flip-flop 7 through the gates 3 and 4 released at $t_2$. The circuit 40′ determines the parity of the number indicated by the five flip-flops 11 to 15 of the progression register 10′. As in the form of embodiment in FIG. 2, its one and zero outputs are connected respectively to the one and zero inputs of the flip-flop 8 through the gates 5 and 6 released at $t_4$. The one and zero outputs of the circuit 30′ are further connected respectively to the inputs for setting the sixth flip-flop 16′ of the register 10′ to the one and zero positions. The flip-flop 26′ of the register 20′ is not used in the operation of the counter 1′ because of the law of progression adopted which will be defined hereinafter and its setting in position through the outputs of the circuit 40′ is effected with a view to functions which do not come within the scope of this invention.

The transfer between the registers 10′ and 20′ only concerns the first five flip-flops in said registers. It takes place without modification at the time $t_1$ as in the case of FIG. 2.

The progression of the register 10′ follows a law such that the combinations are alternatively of the "2 out of 5" type and of the "3 out of 5" type, so that the parity elements which form the basis of the checking, change each time. It is this feature which leads to the elimination of the circuits 50 and 60 for forecasting the parity of the number consecutive to the number indicated by the image register, the parity to be stored in the flip-flop 7 being systematically the reverse parity of that which is indicated by the circuit 30'.

The law of progression selected leads to the following rules:

In order to change over from a combination of the "2 out of five" type to a combination of the "3 out of five" type, the flip-flops 11 to 15 are respectively brought into the opposite state to that of the flip-flops 21 to 25. Actually, it will be seen that the flip-flops 11 to 15 have two AND-gates such as 1111, 1112 for setting to the one position and two AND-gates such as 1121, 1122 for setting to the zero position; all these gates receive a progression pulse at the time $t_3$. The gates such as 1112, 1122 are respectively connected to the zero and one outputs of the corresponding flip-flop 21 of the image register 20' and in parallel with the zero output of the circuit 30', so that when the parity indicated by said circuit is that of a combination of the "2 out of 5" type, the flip-flops 11 to 15 are brought, at the time $t_3$, into the opposite state to that of the flip-flops 21 to 25. At the same moment, the flip-flop 16', which was in the one state, is brought into the zero state through the gate 162'.

The rules for the change over from a combination of the "three out of five" type to a combination of the "two out of five" type are less simple. Since the combination indicated by the flip-flops 11 to 25 is odd, the gates such as 1112 and 1122 are blocked and the progression is effected through the gates such as 1111, 1121 which have an input connected to the 1 output of the circuit 30'. The progression of the flip-flops 12, 13, 14 is dependent on the flip-flops 21, 22, 23 respectively, so that at the time $t_3$, the flip-flop 12, for example, is brought into the one state through the gate 1211 if the flip-flop 21 is in the zero state and into the zero state through the gate 1221 if the flip-flop 21 is in the one state. The same applies to the flip-flops 13 and 14 with respect to the flip-flops 22 and 23.

The progression of the flip-flop 11 depends on a circuit 171 which determines the conditions $\alpha$ and $\beta$ for releasing its gates 1111 and 1121 for bringing into the one and zero states respectively and the progression of the flip-flop 15 depends on a circuit 175 which similarly determines the conditions $\gamma$ and $\vartheta$ for releasing its gates 1511 and 1521.

The circuit 171 is identical to the circuit 33. One of its input AND-gates has its inputs connected to the one output of the flip-flop 21 and to the zero output of the flip-flop 25; the other to the zero output of the flip-flop 21 and the zero output of the flip-flop 24. In Boolean notation, the function $\alpha$ fulfilled by the circuit 171 may therefore be written, calling the one state of the flip-flops 21, 24 and 25, $d_1$, $d_4$ and $d_5$:

$$\alpha=d_1\overline{d}_5+\overline{d}_1\overline{d}_4$$

Similarly, the circuit 175, the input gates of which are connected, the one to the one output of the flip-flop 21 and to the zero output of the flip-flop 25 and the other to the zero output of the flip-flop 21 and to the zero output of the flip-flop 24, fulfills the function:

$$\gamma=d_1\overline{d}_4+\overline{d}_1\overline{d}_5$$

As for the flip-flop 16', it changes its state so as to bring up to three the number of elements equal to one in the combination of the "2 out of 5" type resulting from this progression.

The twenty successive states of the counter 1' thus determine the twenty combinations belonging to the "three out of six" code, and one of these combinations may be selected to serve as a carry intended for a stage of higher rank. This combination, which may, for example, be that in which the three elements 23, 24, 25 indicate the digit 1, may likewise be used to cause a change of state, on each cycle of the counter, in the flip-flop 9, the purpose of which was explained in connection with FIG. 1. For this purpose, the one outputs of the flip-flops 23, 24, 25 are connected through an AND-gate 99 to the symmetrical input of the flip-flop 9.

What I claim is:

1. A programmed progression binary multiple stage counter with continuous checking of its operation comprising a first register and a second register, a source of progression pulses and transfer pulses emanating alternately from a time-base circuit, first gate means controlled by said second register for applying said progression pulses in parallel to all of the stages of said first register in agreement with a given progression coded program, second gate means controlled by said first register for transferring the binary numbers contained in said first register to said second register in response to said transfer pulses, means for checking the parity of the binary numbers which are transferred from said first register to said second register to assure the correctness of said transfer, means for checking that the parity of the binary number resulting from a progression of said first register is in agreement with said progression coded program, and means for indicating an error in parity.

2. A programmed progression binary multiple stage counter with continuous checking of its operation comprising a first register and a second register, a source of progression pulses and transfer pulses emanating alternately from a time-base circuit, first gate means controlled by said second register for applying said progression pulses in parallel to all of the stages of said first register in agreement with a given progression coded program, second gate means controlled by said first register for transferring the binary numbers contained in said first register to said second register in response to said transfer pulses; means for determining the parity of the binary number present in said first register; means for storing said parity at a moment which follows said progression pulses and which precedes said transfer pulses; means for determining the parity of the binary number present in said second register; means for comparing the last said parity with said stored parity at a moment which follows said transfer pulses and which precedes said progression pulses; first warning means for delivering an output signal when said comparison shows that the parities compared are different; means for checking that the parity of the binary number resulting from a progression of said first register is in agreement with said progression coded program; and second warning means for delivering an output signal when the parity of the last said binary number is not in agreement with said progression coded program.

3. A programmed progression binary multiple stage counter with continuous checking of its operation comprising a first register and a second register, a source of progression pulses and transfer pulses emanating alternately from a time-base circuit, first gate means controlled by said second register for applying said progression pulses in parallel to all of the stages of said first register in agreement with a given progression coded program, second gate means controlled by said first register for transferring the binary numbers contained in said first register to said second register in response to said transfer pulses, means for checking the parity of the binary numbers which are transferred from said first register to said second register to assure the correctness of said transfer; first warning means for delivering an output signal when said parity is changed; means for determining from the state of said second register the parity of the binary number which follows the binary number present in said second register according to said progression coded program; means for storing the parity of said following binary number at a moment which follows said transfer pulses and which precedes said progression pulses, means for determining the parity of the number present in said first register; means for comparing the last said parity with said stored parity at a moment which follows said progression pulses and which precedes said transfer pulses and second warning means for delivering an output signal when said comparison shows that the parities compared are different.

4. A self-checking binary counter the progression of which is programmed in accordance with a test code of the three out of six type, comprising a first register and a second register each having six binary stages, a source of transfer pulses and progression pulses emanating alternately from a time-base circuit, first gate means for transferring the binary numbers contained in the first five binary stages of said first register to the first five stages of said second register in response to said transfer pulses, second gate means controlled by said second register in accordance with said code for applying said progression pulses to said first register, so that the binary numbers contained in the first five binary stages of said registers are alternately of the two out of five type and of the three out of five type; means for determining the parity of the binary number present in the said first five binary stages of said first register; first storage means for storing said parity at a moment which follows said progression pulses and which precedes said transfer pulses; means for determining the parity of the binary number present in the said first five binary stages of said second register; means for comparing the last said parity with said stored parity at a moment which follows said transfer pulses and which precedes said progression pulses; first warning means for delivering an output signal when said comparison shows that the parities compared are different; second storage means for storing the parity opposite to the parity of the binary number present in said first five binary stages of said second register at a moment which follows said transfer pulses and which precedes said progression pulses, means for comparing the parity of the binary number present in said first five binary elements of said first register to the parity stored in said second store means at a moment which follows said progression pulses and which precedes said transfer pulses and second warning means for delivering an output signal when the last said compared parities are different.

5. A counter as claimed in claim 4 including a bistable trigger circuit which operates at a slower frequency than the repetition frequency of the progression pulses and wherein each of said means for parity determining and checking comprises two outputs delivering opposite signals in accordance with the state of said trigger circuit, whereby circuit faults can be detected.

No references cited.

MALCOLM A. MORRISON, *Primary Examiner.*

M. SPIVAK, *Assistant Examiner.*